Y2587 OR 3,963,900

T235/379 315

United States Patent [19]

Sawaguchi et al.

[11] 3,963,900

[45] June 15, 1976

[54] NIGHT DEPOSITORY CONTROL SYSTEM

[75] Inventors: Yoji Sawaguchi, Tokyo; Katsumasa Ogawa, Yokohama, both of Japan

[73] Assignee: Fujitsu Ltd., Japan

[22] Filed: Sept. 30, 1974

[21] Appl. No.: 510,755

[30] Foreign Application Priority Data

Sept. 28, 1973 Japan ............ 48-108994

[52] U.S. Cl. ............ 235/61.7 B; 235/61.11 D

[51] Int. Cl.[2] ............ G06K 5/00; G06K 7/00; H04N 9/00

[58] Field of Search ............ 235/61.7 B, 61.11 D, 235/61.11 E; 340/149 A

[56] References Cited

UNITED STATES PATENTS

| | | | |
|---|---|---|---|
| 3,641,497 | 2/1972 | Constable | 235/61.7 B |
| 3,652,795 | 3/1972 | Wolf | 235/61.7 B |
| 3,715,569 | 2/1973 | Hicks | 235/61.11 D |
| 3,743,134 | 7/1973 | Constable | 235/61.11 D |
| 3,845,277 | 10/1974 | Voss et al. | 235/61.7 B |

*Primary Examiner*—Vincent P. Canney
*Attorney, Agent, or Firm*—Staas & Halsey

[57] ABSTRACT

A night depository control system by the combination of a night depository control circuit with an automatic transacting machine having at least one of the functions of automatic cash withdrawal and deposit, based on a customer's card. When a customer is identified and verified as a night depository contractor, the night depository control circuit provides a night depository door opening signal to open the door of the night depository and that when depositing of a money bag into the night depository is detected, customer's data are stored and a receipt is issued to the customer.

4 Claims, 9 Drawing Figures

NIGHT DEPOSITORY CONTROL SYSTEM

BACKGROUND OF THE INVENTION

1. Field of the Invention

This invention relates to a night depository control system, and more particularly a control system for a night depository utilizing an automatic transacting machine having at least one of the function of automatic cash dispensing and depositing.

2. Description of the Prior Art

In banks or like establishments, night depositories are provided for use outside their business hours. It is desirable that the door of an deposit inlet of the night depository is opened only for authorized customers to permit them to use the night depository and that a receipt is issued in evidence of the use of the night depository. A variety of proposals have heretofore been made for such a night depository and a control device for the exclusive use of the night depository is usually provided. Further, for the purposes of labor saving of business inside the business hours and giving service to customers outside the business hours, many banks and like establishments employ an automatic cash dispensing or depositing machine and, in general, customer verification and identification are achieved by making use of a card.

SUMMARY OF THE INVENTION

This invention is to provide a night depository control system with which it is possible to effect verification and identification of a night depository contractor, issuance of a receipt, etc. by utilizing the customer verifying and identifying function of an automatic transacting machine having at least one of cash dispensing or depositing functions, thereby to economically control the night depository.

Briefly stated, the night depository control system of this invention comprises a night depository control circuit combined with an automatic transacting machine which includes means for reading out a card having recorded thereon transaction data such as a customer identification number, a transaction type code, etc., means for identifying a customer based on the card data read out from the card and a secret number entered by the customer, means for achieving at least one of cash dispensing and depositing operations in response to the operation of the identifying means, means for issuing a receipt and means for storing data concerning the transaction. When a night depository contractor is identified by the above identifying means, the night depository control circuit provides a signal for opening the door of the night depository and when deposit into the night depository is detected, the night depository control circuit actuates the above receipt issuing means and data storing means to issue a receipt to the customer and store data of the transaction.

DESCRIPTION OF THE PREFERRED EMBODIMENTS

Figure 1:
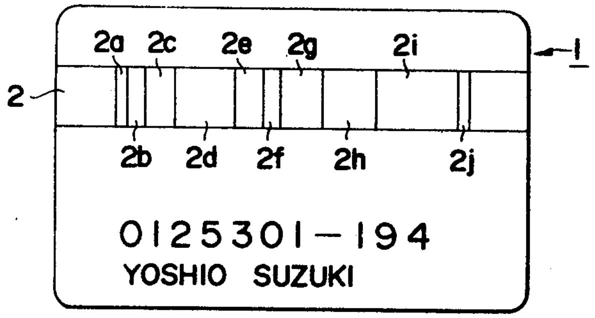
FIG. 1 is a schematic diagram, for explaining one example of a card for use in this invention.

FIG. 1 illustrates one example of a customer's card 1, on which a customer's name and number, etc. are embossed and a magnetic stripe 2 is provided. This magnetic stripe 2 is composed of such areas as, for example, a start character 2*a*, a label 2*b*, a bank number 2*c*, an identification number (an account number) 2*d*, a secret number 2*e*, a transaction type code (authorized transaction type) 2*f*, a validity date 2*b*, the balance 2*h*, the rest 2*i* and a stop character 2*j*. The transaction type code 2*f* is a code corresponding to the transaction authorized for the numbered account, such as a checking account, credit, saving account, the use of a night depository or the like. The label 2*b* is a code for identifying whether the card is one for use with an automatic transacting machine.

Figure 2:
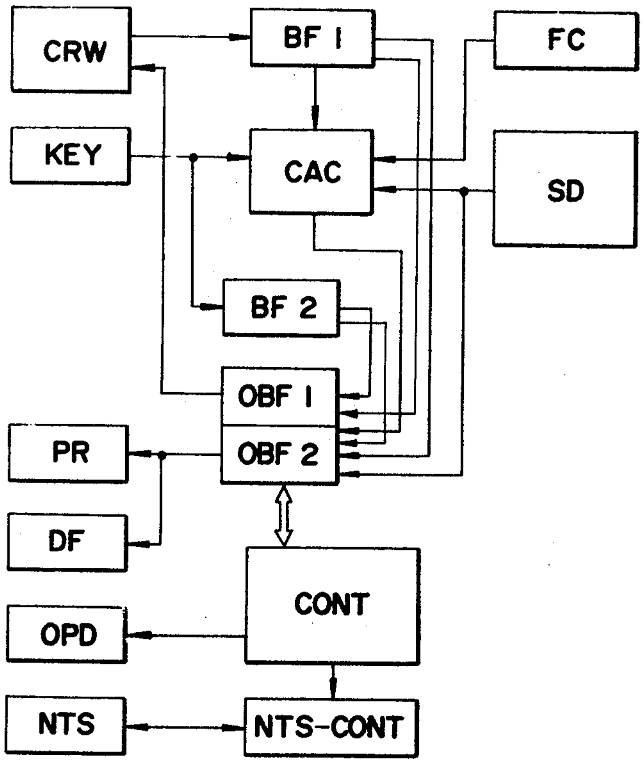
FIG. 2 is a block diagram showing one embodiment of this invention.
Figure 3A:
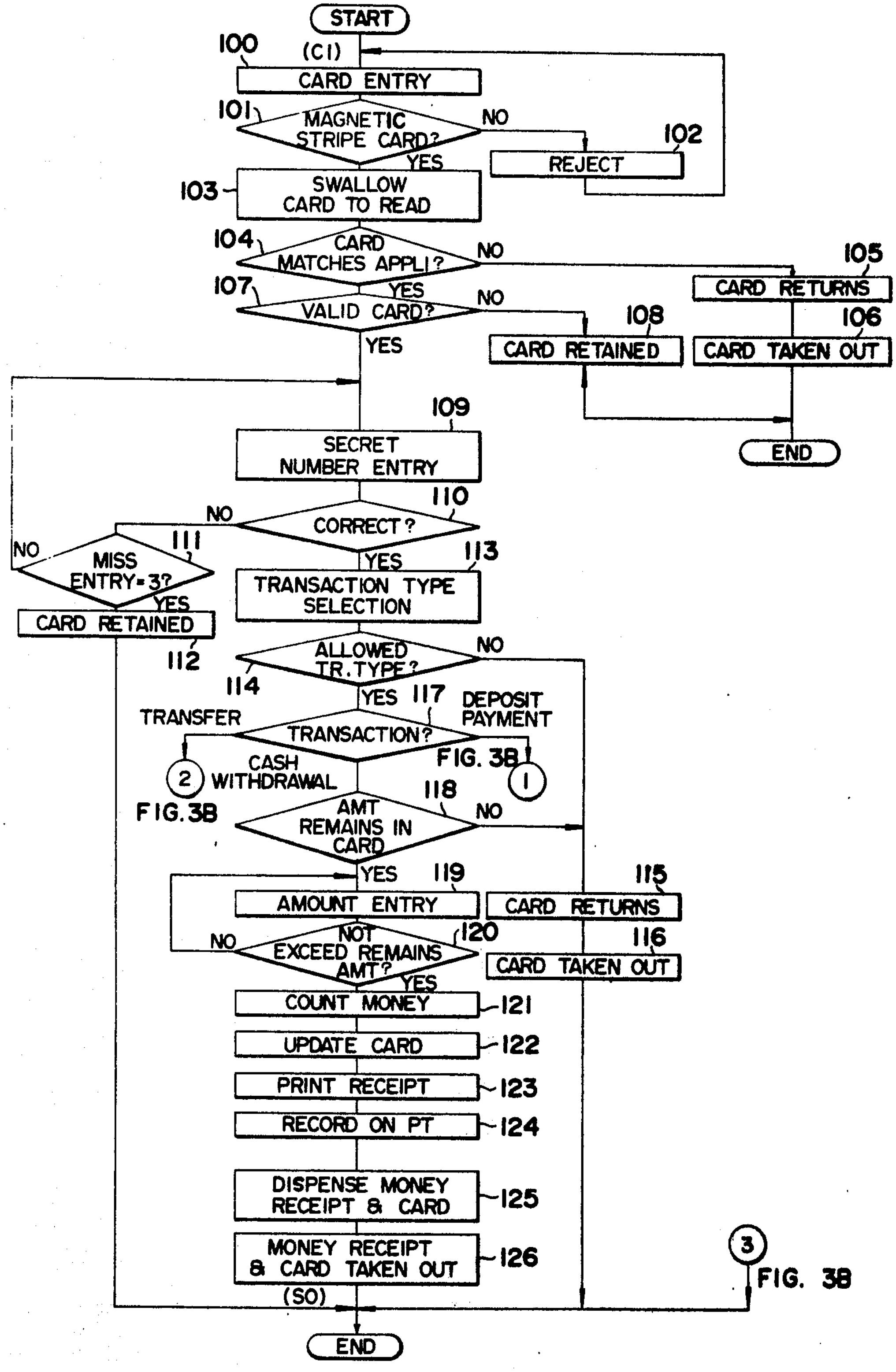
FIG. 3, consisting of 3A and 3B, is an operation flow chart of the embodiment of FIG. 2.
Figure 3B:
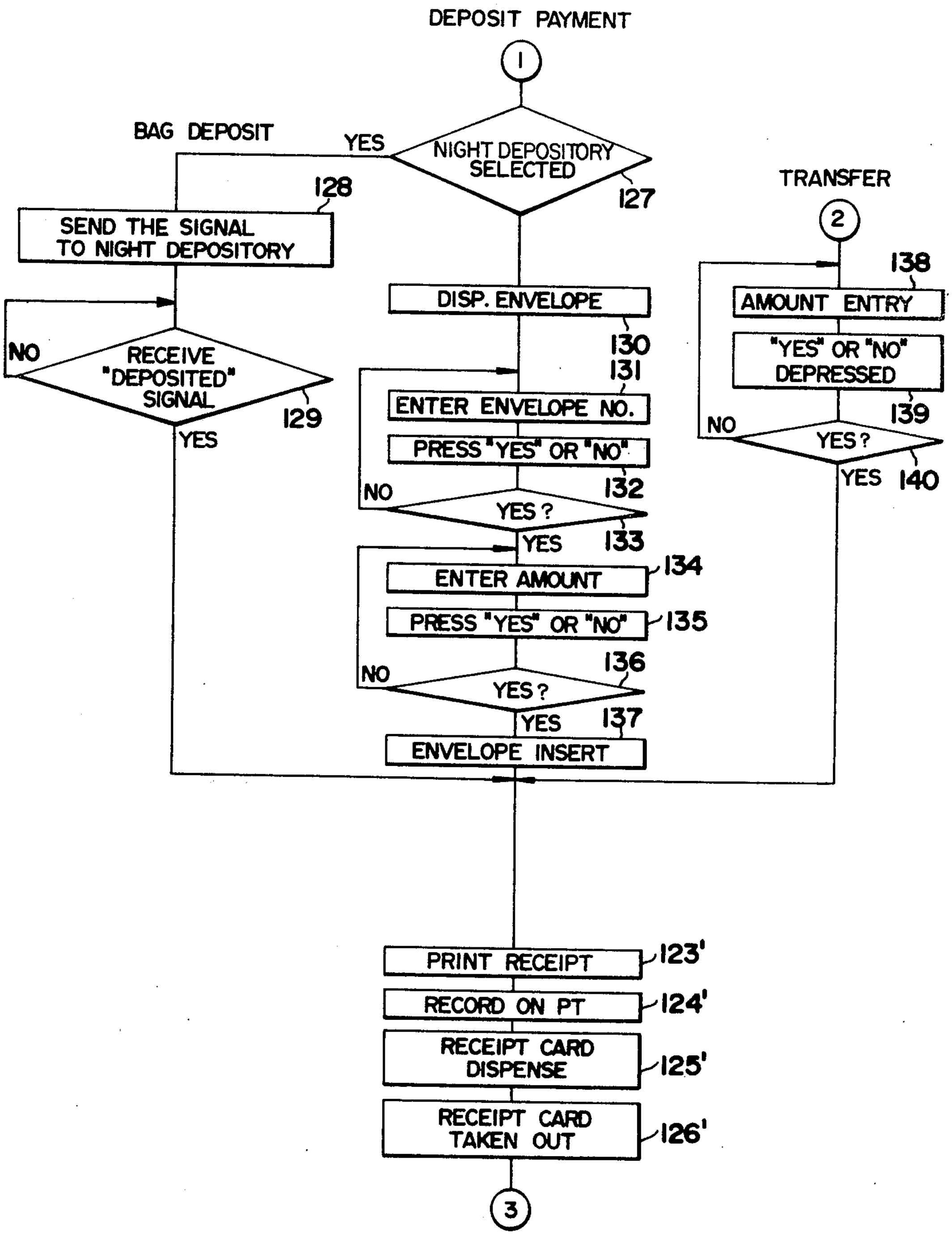

FIG. 2 shows in block form one example of this invention. FIGS. 3*a* and 3*b* show a flow chart of the example of this invention.

When the card 1 is entered into the machine (100), it is checked by a magnetic head disposed at the entrance of the machine as to whether or not it is a card having the magnetic stripe 2(101). If the entered card has no magnetic stripe 2, a shutter provided at a card insertion slit of the machine does not open. Where the card has the magnetic stripe 2, a shutter is opened and the card is advanced to a card reader/writer CRW. Suitable such systems and the mechanisms therefor are known in the prior art and hence will not be described in detail.

The data recorded in the magnetic stripe 2 on the card 1 supplied to the card reader writer CRW is read out (103). The card data thus read out is stored in a data buffer BF 1. The card data stored in the data buffer BF 1 includes data proving the validity of the card, for example, the validity date 2*g* and the bank number 2*c*. On the other hand, a fixed data unit SD has also stored therein the number of a bank with which this machine can transact or the like, so that, in a comparison arithmetic circuit CAC, the validity date 2*g* is checked fist and then the bank number 2*c* is collated with that stored in the fixed data unit SD (104). If the card is found by the above checking and collation to match with the application, the next step is followed. If not so, the card is returned to the customer (105).

Thereafter, the identification number included in the card data is collated by the comparison arithmetic circuit CAC with card numbers registered in a hot card file FC (107) and if the former agrees with any one of the latter, the entered card is a hot card, and hence is retained in the machine (108).

Thus, the validity of the card is verified and if the card is effective and is not a hot card, entry of the customer's secret number is instructed by a control circuit CONT to an operator instruction unit OPD (109). Then, when the customer enters this secret number into the machine through a keyboard KEY, this input data and the secret number included in the card data are collated by the comparison arithmetic circuit CAC as to whether or not they bear a predetermined relation to each other (110). If they do not have the predetermined relation to each other, the customer (operator) is instructed by the operator instruction unit OPD to re-enter the secret number, up to a certain number of times. In this case, if the correct secret number i.e., that with which the predetermined relation is obtainable within the prescribed number of times (e.g., three times) is not entered, the card is retained in the device (111) and (112). Suitable such systems are known in the prior art and hence no detailed description will be given. For the collation of the secret number described above, it is possible to employ a scramble method to reduce the chance of detecting a secret number, as is known in the prior art. If the above predetermined relation relation is obtained, entry of the transaction type, for example, cash withdrawal, the use of night depository, transfer, or the like, is instructed by the operator instruction unit OPD (113).

Figure 4:
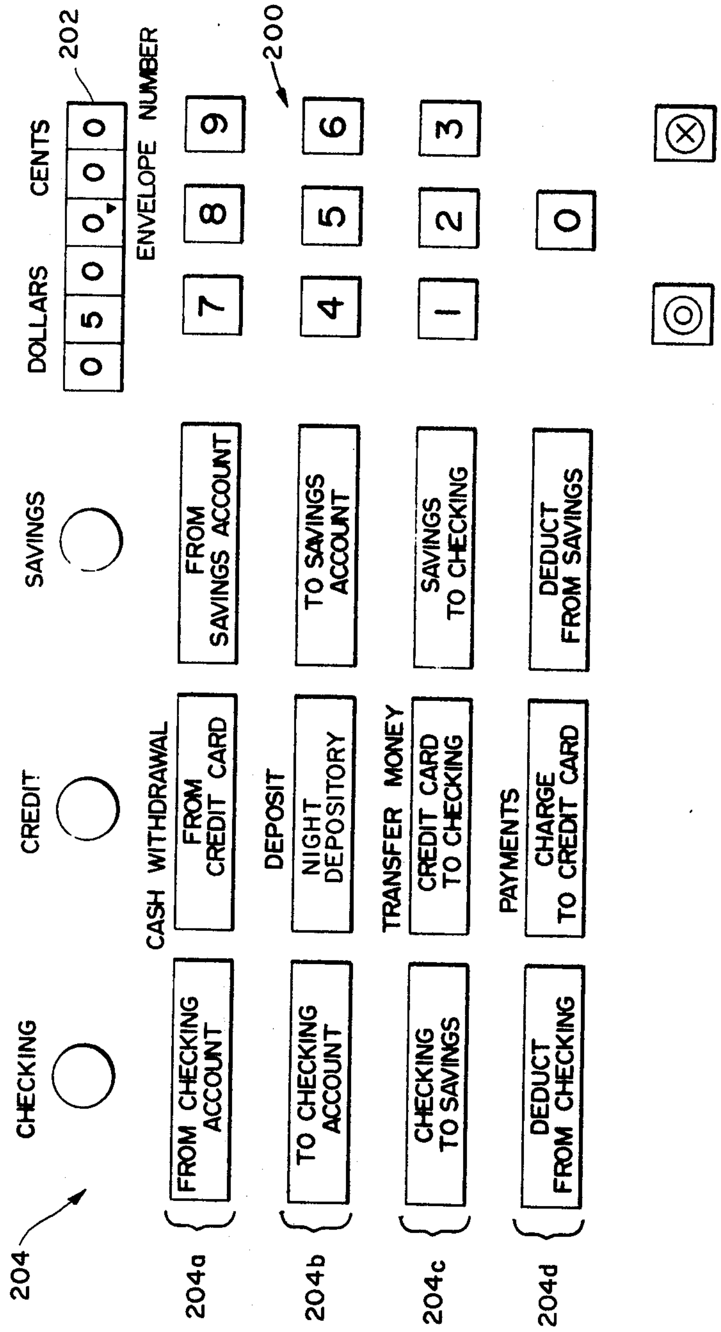
FIG. 4 is a schematic diagram, for explaining one example of a keyboard.

The keyboard KEY has such a construction as shown, for example, in FIG. 4. The secret number, the amount of money, etc. are entered by selectively activating the ten keys 0 to 9, shown at 200 and the entered content is indicated on an indicating unit 202. A selected transacton type key is actuated after the secret number entered by the ten keys 204 is confirmed by the customer.

The transaction type code entered by the actuation of the transaction type key (113 in FIG. 3A) is compared by the comparison arithmetic circuit CAC with the card data as to whether it is a contracted i.e., allowed transaction type or not for the given card account (114) and if it is not the contracted transaction type, the card is returned to the customer (115). It it is an allowed transaction, the entered transaction type is identified (117) and if the entered transaction type is, for example, a withdrawal from the savings account, it is checked by the comparison arithmetic circuit CAC whether the balance recorded on the card is no alance o not (118). If there is no balance, the card is returned (115). When there is a positive balance, entry of the amount of money to be withdrawn is instructed by the operator instruction unit OPD (119).

When the customer enters the amount of money to be withdrawn by actuating the ten keys of the keyboard KEY, it is compared in the comparison arithmetic CAC with the balance in the card data (120). If the amount of money desired to be withdrawn is smaller than the balance, counting of bills in the amount to be withdrawn is instructed to a cash counter and the instructed number of bills are counted and separated (121). If the amount of money desired to be withdrawn is larger than the balance, entry of the amount to be withdrawn is instructed again by the operator instruction unit OPD (119). Thus, the customer becomes aware that the amount desired to be withdrawn, entered by him previously, exceeds the balance and then he can enter again the amount smaller than the balance. Dispensing controls for cash counters are known in the prior art and hence are not described in detail in this specification.

Upon completion of counting by the cash counter, the card data of the data buffer BF 1 is transferred to an output data buffer OBF 1 for updating the data. At this time, the balance, the date of use of the card, etc. to be recorded on the card are updated. Then, the content of the output data buffer OBF 1, as newly edited i.e., updated, is transferred to the card reader writer CRW to rewrite the magnetic stripe 2 (122).

Figure 5:
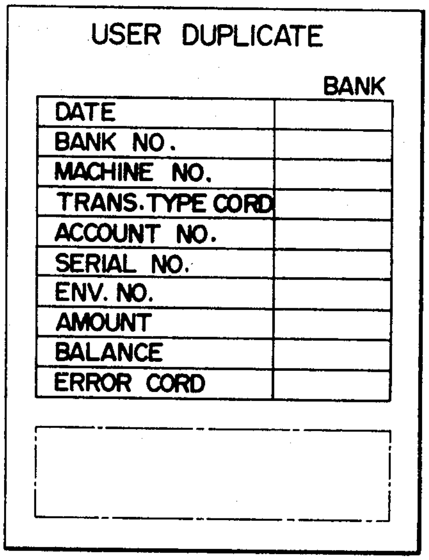
FIG. 5 is a schematic diagram, for explaining one example of a receipt for use in this invention.

Further, the transaction data (the transaction date, the bank number, a machine number, the transaction type, the customer's identification number, a consecutive (Serial) number, the amount of money, the balance, etc.) is drawn out from the data buffers BF1 and BF2 and the solid data unit SD and edited and then stored in the output data buffer OBF2. The content of this output data buffer OBF2 is transmitted to a printer PR (123) and a data storage unit DF (124). In the printer PR, a receipt such, for example, as shown in FIG. 5 and a journal are printed. The data storage unit DF is composed of a paper tape, a magnetic tape, a magnetic drum, a magnetic disc or the like, on which is recorded the data which is required as an input to a processing unit which subsequently operates thereon. It is also possible, of course, to omit the data storage unit and to employ the aforesaid journal as data storage means.

Upon completion of the above processing, the printed receipt and the counted bills are dispensed and the card is returned (125 and 126). Then, the operator instruction unit OPD instructs the customer to take out the receipt and the bills from the dispensing outlet. Thus, the receipt and bills are taken out from the dispensing outlet, completing the process for withdrawal.

In the case of using a night depository, when the operator instruction unit OPD instructs entry of the transaction type, a key "TO NIGHT DEOSITORY" of a deposit key group 204b of the keyboard (KEY in FIG. 2) is depressed. Then, the transaction type code in the card data is checked to determine if it is a code authorizing use of the night depository by the comparison arithmetic circuit CAC (114) and, if the code is not an authorized one, the card is returned (115 and 116). Where the code is an authorized one, selection of the night depository is verified (127) (FIG. 3B) and deposit of a money bag into the night depository NTS is instructed by the operator instruction unit OPD. A night depository control circuit NTS-CONT sends a signal to the night depository NTS to open its door (128).

Upon receipt of this signal, the night depository NTS opens its shutter and when the customer deposits the money bag, the night depository NTS detects it and closes the door (129) and sends a "deposited" signal to the night depository control circuit NTS-CONT. Then, the night depository control circuit NTS-CONT instructs the control circuit CONT to update the card 1, print a receipt and a journal and record the transaction data in the data storage unit DF. These instructed operations are exactly the same as those described previously with regard to the case of withdrawal.

In the transaction type identification process (117) described above, where a key "TO SAVINGS ACCOUNT" of the deposit key group is selected, it is verified that the night depository is not selected (127), and then an envelope is dispensed from the machine. This envelope depositing system is disclosed in detail in our copending application entitled "Article Depositing Machine" filed on June 14, 1974 Ser. No. 479,518, assigned to a common assignee, and hence will not be described in detail but will hereinbelow be outlined briefly.

The envelope dispensed from the machine has printed thereon an envelope number and the customer enters the envelope number into the machine through the keyboard KEY (131). The operator instruction unit OPD instructs the customer to press a key "YES" when he has correctly entered the envelope number and a key "NO" when he has incorrectly entered the envelope number (132). Upon entry of the envelope number, it is verified whether the key "YES" or "NO" has been pressed (133) and in the case of "NO", the operator instruction unit OPD instructs again re-entry of the envelope number. In the case of "YES", the operator instruction unit OPD instructs the customer to enter the amount of money to be deposited (134). When the customer has entered the amount of money to be deposited, the operator instruction unit OPD instructs the customer to verify whether the amount of money to be deposited has been correctly entered or not (135). Where the customer has correctly entered the amount of money to be deposited, he presses the key "YES" and if he has incorrectly entered the amount, he presses the key "NO". When the key "NO" is pressed the instruction (135) is given again for reentry of the amount. After verificaton of pressing of the key "YES" (136), the operator instruction unit OPD instructs the customer to deposit the envelope (137). Thereafter, a receipt is printed (123'), the transaction is recorded on a data storage medium such as a paper tape (124') and the receipt and the card are dispensed (125'), as is the case with the aforesaid cash dispensing.

In the aforesaid transaction type identification process (117), when transfer (204c, FIG. 4) is selected, the operator instruction unit OPD instructs the customer to enter the amount of money to be paid (138). After the customer has entered the amount of money through the keyboard KEY (FIG. 2), the operator instruction unit OPD instructs the customer to check whether or not he has correctly entered the amount (139) and instructs him to press the key "YES" or "NO" depending upon whether he has correctly entered the amount or not. Then, it is detected which key has been pressed, "YES" or "NO", (140) and in the case of the key "NO" having been pressed, the instruction (138) is given again for re-entry of the amount of money to be paid. Where the key "YES" has been pressed, a receipt is printed (123'), the transaction is recorded on the data storage medium (124') and the receipt and the card are dispensed (125') as is the case with the envelope deposit described above.

Although the envelope depositing system has been described above, it is also possible to employ a known deposit system having a function of examining the genuineness of bills.

Further, the foregoing description has been given in connection with the transacting machine having both of the cash dispensing function and the depositing function but it is evident that a transacting machine having only one of the cash dispensing function and the depositing function can also be employed.

Figure 6:
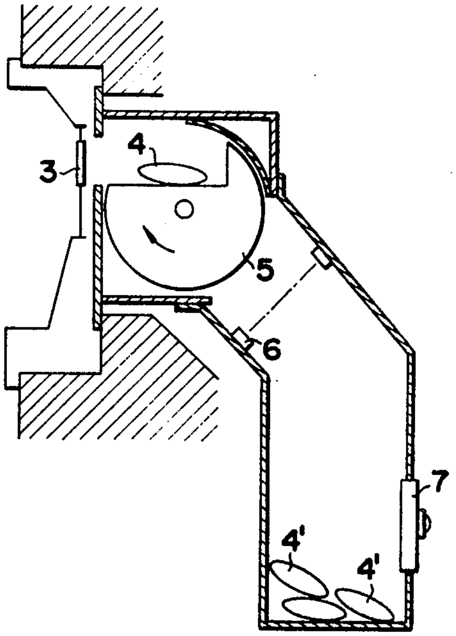
FIG. 6 is a schematic cross-sectional view of a night depository.
Figure 7:
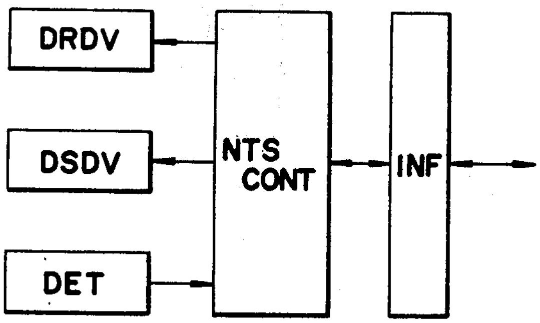
FIG. 7 is a block diagram showing a control circuit of the night depository.

FIG. 6 is a cross-sectional view showing one example of the night depository. In FIG. 6, reference numeral 3 indicates a door; 4 designates a money bag deposited in the machine; 4' denotes money bags already deposited in a chest; 5 identifies a rotary receptacle; 6 represents a deposit detector; and 7 shows a door of the night depository. FIG. 7 is a block diagram of a control unit for the night depository. When the night depository control circuit NTS-CONT receives a signal from the control circuit CONT through an interface INF as described above, a door driving circuit DRDV is actuated for opening the door 3. When the money bag 4 is placed on the rotary receptacle 5, a receptacle driving circuit DSDV is actuated to rotate the rotary receptacle 5 in a direction of the arrow to drop the money bag 4 into the chest. This is detected by the deposit detector 6 (DET), from which a deposit completion signal is applied to the night depository control circuit NTS-CONT, which, in turn, instructs the control circuit CONT through the interface INF to control recording of the use of the night depository.

Figure 8:
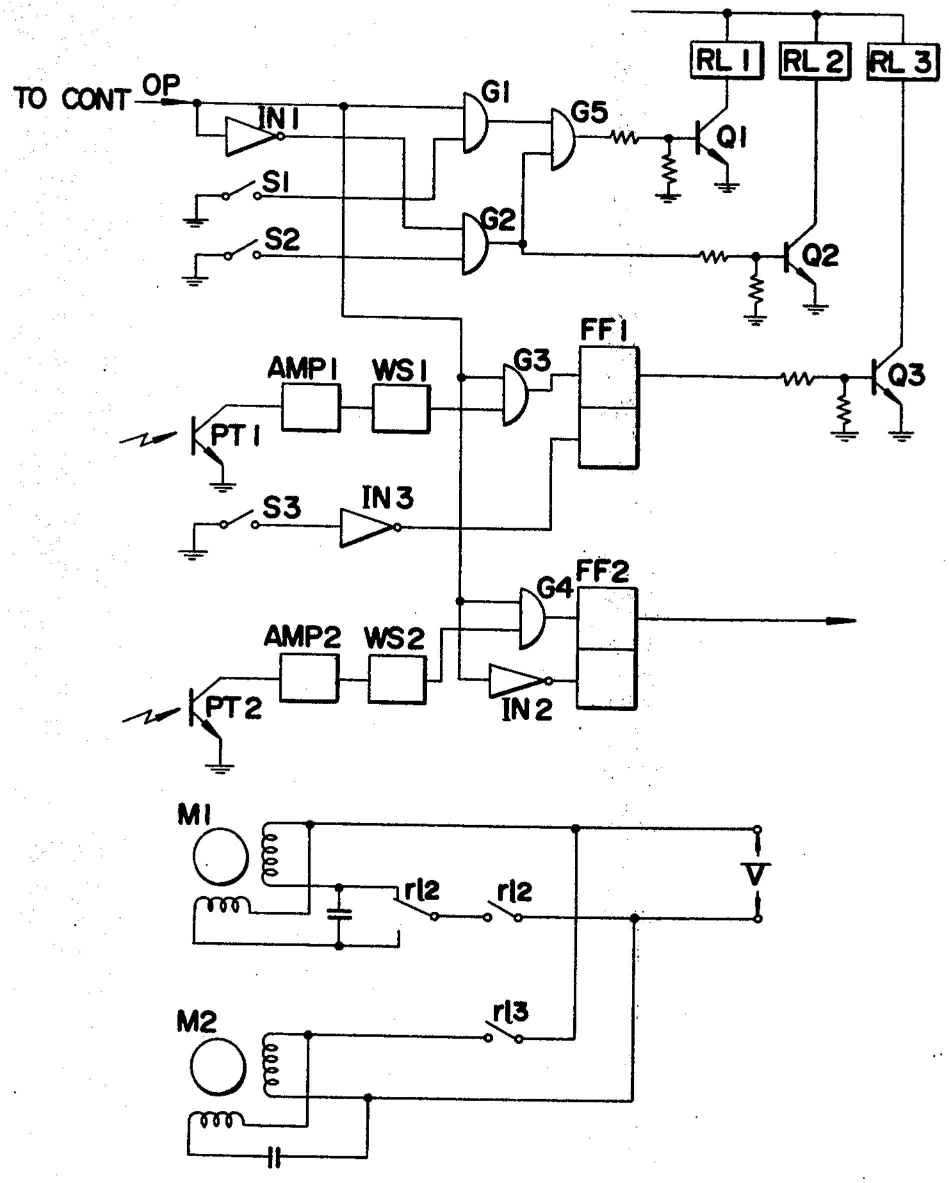
FIG. 8 shows its circuit diagram.

FIG. 8 illustrates one example of the night depository control circuit. Reference character S1 indicates a mirco-switch for detecting opening of the door 3; S2 designates a micro-switch for detecting closing of the door 3; and S3 denotes a micro-switch for detecting rotation of the rotary receptacle 5. In normal condition, since the door 3 is closed, the switches S1 and S3 are in the off state and the switch S2 is in the on state. Let it be assumed that when the switches S1, S2 and S3 are all in the off state, and logic "1" signal is applied to gates G1 and G2 and an inverter IN3 and that when the switches S1, S2 and S3 are all in the on state, a logic "0" signal is applied to the gates G1 and G2 and the inverter IN3. When a door opening signal op from the control circuit CONT becomes "1", the base current of a transistor Q1 is applied through the gate G1 and an "OR" circuit G5, so that the transistor S1 is turned on to actuate a relay RL1.

By the actuation of the relay RL1, its contact rl1 is closed to rotate a door actuating motor M1, by which the door 3 is opened. When the door 3 is completely opened, the switch S1 is turned on and the relay RL1 is restored to stop the motor M1.

When a customer places the money bag 4 on the rotary receptacle 5, it is detected by a detector, that is, a photo transistor PT1 and its detected output is applied to the one input of an "AND" circuit G3 through an amplifier AMP1 and a waveform shaping circuit WS1. At this instant, the door opening signal op is still "1", so that a flip-flop circuit FF1 is set by the output from the gate G3 and, by its set output, a transistor Q3 is turned on. As a result of this, a relay RL3 is actuated to close its contact rl3 to rotate a receptacle driving motor M2, by which the rotary receptacle 5 with the money bag 4 placed thereon is rotated. After one rotation of the rotary receptacle 5, the switch S3 is turned on to reset the flip-flop circuit FF1 through the inverter IN3, so that the transistor Q3 is turned off and the relay RL3 is restored to open its contact rl3, thus stopping the motor M2.

When the rotary receptacle 5 is rotated to drop the money bag 4 into the chest, it is detected by a deposit detector, for example, a phototransistor PT2, the detected output from which is applied to the one input of an "AND" circuit G4 through an amplifier AMP2 and a waveform shaping circuit WS2. Since the door opening signal op is "1", a flip-flop circuit FF2 is set and its set output is a deposit completion signal.

Based on the deposit completion signal, issue of a receipt, rewriting of the data storage card, etc. are achieved and the door opening signal op becomes "0." The flip-flop circuit FF2 is reset through an inverter IN2 and the transistor Q2 is turned on through the inverter IN1 and the gate G2 and the transistor Q1 is turned on through the inverter IN1, the gate G2 and the "OR" circuit G5, by which the relays RL1 and RL2 are actuated.

By the actuation of the relay RL2, its contact rl2 is switched and the motor M1 is reversed, so that the door 3 is closed. When the door 3 is completely closed, the switch S2 is turned on and the transistors Q1 and Q2 are turned off and the relays RL1 and RL2 are restored to stop the motor M1, thus returning the machine to its initial state.

As has been described in the foregoing, this invention adds a night depository control circuit to an automatic transacting machine having at least one of the automatic cashing dispensing and depositing functions and enables deposit, withdrawal and the use of the night depository with one card. Also in the case of using the night depository, a receipt is issued and the transaction data is also recorded, giving better service to customers. Further, in the case of using the night depository, identification and verification of customers are achieved, as is the case with the deposit and withdrawal, so that persons other than night depository contractors cannot use the night depository, and this provides for enhanced reliability and safety of the night depository.

It will be apparent that this invention is not limited specifically to the foregoing examples and that many modifications and variations may be effected without departing from the scope of the novel concepts of this invention.

What is claimed is:

1. A night depository control system for use with an automatic banking transaction system providing at least one of cash dispensing and depositing functions and employing a card having data recorded thereon including at least a coded identification of a customer account for the customer to whom the card is issued and a transaction code identifying each type of transactions authorized for that customer account, the transaction system including means for reading data from the card, means operable, by the customer, for entering the type of transaction desired, data concerning the transaction, and a secret number corresponding to a given customer account, means for authorizing the customer to perform a transaction, said authorizing means including means for determining the existence of a predetermined relation of the entered transaction type and the authorized transaction type recorded on the card and for determining the existence of a predetermined relation of the secret number entered by the customer and the coded identification of the customer account read from the card, means for issuing a receipt for a transaction when authorized and performed by the transaction system, and means for storing data concerning the transaction in accordance with data read from the card and data entered by the customer, said night depository control system including night depository apparatus being selectively controllable from a state of non-acceptance to a state for acceptance of a deposit, to enable placement of a deposit in said apparatus, said transaction entering means including a night depository transaction entering means and said card including a position thereon for recording a night depository authorized transaction code, control means responsive to a determination by said determining means of the entry of an authorized night depository transaction code, for controlling said night depository apparatus to said state for acceptance of a deposit for permitting placement of a deposit therein, means for detecting placement of a deposit in said night depository apparatus and for issuing a deposit detection signal in response thereto, and said control means responding to the deposit detection signal to actuate said receipt issuing means for issuing a receipt for the deposit to the customer and to enable said storing means for storing the data concerning the transaction entered by operation of said data entering means by the customer.

2. A night depository control system as recited in claim 1, wherein said control means is responsive to said deposit detection signal for controlling said night depository apparatus to said non-acceptance state.

3. A night depository control system as recited in claim 1, wherein aid night depository apparatus includes a movable receptacle in which a deposit is placed and a further receptacle for receiving and storing individual deposits placed in said movable receptacle, and there is further provided a further detecting means for detecting a deposit in said movable receptacle and producing a further detecting signal in response thereto, and driving means for said movable receptacle and said control means is responsive to said further detecting signal to energize said driving means for moving said movable receptacle to transfer a deposit therein to said further receptacle.

4. A night depository control system as recited in claim 3, wherein said first named detectomg, eams detects a deposit moving from said movable receptacle to said further receptacle to actuate said receipt issuing means and to store the data of the transaction in accordance with confirming completion of the deposit transaction.

* * * * *

UNITED STATES PATENT AND TRADEMARK OFFICE

CERTIFICATE OF CORRECTION

PATENT NO. : 3,963,900

DATED : June 15, 1976

INVENTOR(S) : Yoji Sawaguchi et al

It is certified that error appears in the above-identified patent and that said Letters Patent are hereby corrected as shown below:

Column 1, line 37, change "or" to --and--.
Column 3, line 39, change "alance" to --balance--.
Column 3, line 40, change "o" to --or--.
Column 8, line 44, change "detectomg, eams" to --detecting means--.

Signed and Sealed this

Seventh Day of September 1976

[SEAL]

*Attest:*

RUTH C. MASON
*Attesting Officer*

C. MARSHALL DANN
*Commissioner of Patents and Trademarks*